(12) United States Patent
Masaki et al.

(10) Patent No.: US 10,261,511 B2
(45) Date of Patent: Apr. 16, 2019

(54) MOBILE BODY AND POSITION DETECTION DEVICE

(71) Applicant: Hitachi Industrial Equipment Systems Co., Ltd., Chiyoda-ku, Tokyo (JP)

(72) Inventors: Ryoso Masaki, Tokyo (JP); Shuichi Maki, Tokyo (JP); Kazuto Shirane, Tokyo (JP); Takuya Naka, Tokyo (JP); Kohsei Matsumoto, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 0 days.

(21) Appl. No.: 14/778,314

(22) PCT Filed: Mar. 4, 2014

(86) PCT No.: PCT/JP2014/055361
§ 371 (c)(1),
(2) Date: Sep. 18, 2015

(87) PCT Pub. No.: WO2014/156498
PCT Pub. Date: Oct. 2, 2014

(65) Prior Publication Data
US 2016/0062357 A1    Mar. 3, 2016

(30) Foreign Application Priority Data
Mar. 28, 2013   (JP) .................... 2013-068049

(51) Int. Cl.
*G05D 1/00*   (2006.01)
*G05D 1/02*   (2006.01)
(Continued)

(52) U.S. Cl.
CPC .............. *G05D 1/0088* (2013.01); *B25J 5/00* (2013.01); *B25J 9/1694* (2013.01); *G05D 1/024* (2013.01);
(Continued)

(58) Field of Classification Search
None
See application file for complete search history.

(56) References Cited

U.S. PATENT DOCUMENTS 6,751,535 B2 *   6/2004   Mori ...................... G01C 21/12
                                                    318/587
8,965,561 B2 *   2/2015   Jacobus ............... G06Q 10/087
                                                    700/214
(Continued)

FOREIGN PATENT DOCUMENTS

CN   1161268 A   10/1997
CN   102269994 A   12/2011
(Continued)

OTHER PUBLICATIONS

International Search Report (PCT/ISA/210) dated Apr. 8, 2014, with English translation (four (4) pages).
(Continued)

*Primary Examiner* — Truc M Do
(74) *Attorney, Agent, or Firm* — Crowell & Moring LLP

(57) ABSTRACT

A mobile apparatus includes a position detection device, and an autonomous mobile body. The position detection device includes input means for inputting route data, a distance sensor, map data, position identification means, and relative route calculation means for calculating a relative position and a relative angle to a position of the target point from the position data and the route data of the mobile body. The autonomous mobile body includes a controller that controls an autonomous travel of the autonomous mobile body itself by using the relative position and the relative angle received from the position detection device as control signals.

3 Claims, 7 Drawing Sheets

(51) Int. Cl.
*B25J 5/00* (2006.01)
*B25J 9/16* (2006.01)

(52) U.S. Cl.
CPC ... *G05D 1/0274* (2013.01); *G05D 2201/0206* (2013.01); *G05D 2201/0216* (2013.01); *Y10S 901/01* (2013.01)

(56) References Cited

U.S. PATENT DOCUMENTS

| | | | |
|---|---|---|---|
| 9,535,422 B2* | 1/2017 | Minoiu-Enache | G05D 1/0223 |
| 2002/0099481 A1* | 7/2002 | Mori | G01C 21/12 |
| | | | 701/23 |
| 2005/0251313 A1* | 11/2005 | Heinrichs-Bartscher | |
| | | | B60K 31/0008 |
| | | | 701/41 |
| 2005/0288079 A1 | 12/2005 | Tani | |
| 2007/0192910 A1* | 8/2007 | Vu | B25J 5/007 |
| | | | 700/245 |
| 2008/0243378 A1* | 10/2008 | Zavoli | G01C 21/28 |
| | | | 701/533 |
| 2008/0244920 A1* | 10/2008 | Stegmaier | E02F 3/847 |
| | | | 33/285 |
| 2009/0102629 A1* | 4/2009 | Kaller | B60Q 9/008 |
| | | | 340/435 |
| 2011/0172850 A1* | 7/2011 | Paz-Meidan | B25J 5/00 |
| | | | 701/2 |
| 2011/0178669 A1* | 7/2011 | Tanaka | G05D 1/0272 |
| | | | 701/25 |
| 2011/0301800 A1 | 12/2011 | Furuno et al. | |
| 2013/0116880 A1* | 5/2013 | Shitamoto | G05D 1/0236 |
| | | | 701/25 |
| 2015/0168155 A1* | 6/2015 | You | G01C 21/206 |
| | | | 701/409 |
| 2016/0019807 A1* | 1/2016 | Uchida | G09B 9/042 |
| | | | 434/65 |

FOREIGN PATENT DOCUMENTS

| | | |
|---|---|---|
| EP | 2 595 025 A1 | 5/2013 |
| JP | 10-207504 A | 8/1998 |
| JP | 2006-7368 A | 1/2006 |
| JP | 2010-95146 A | 4/2010 |
| JP | 2010-140247 A | 6/2010 |
| JP | 2011-175393 A | 9/2011 |
| JP | 2011-248648 A | 12/2011 |
| JP | 2012-22468 A | 2/2012 |
| JP | 2012-105557 A | 6/2012 |
| JP | 2012-138086 A | 7/2012 |
| WO | WO 97/36217 A1 | 10/1997 |
| WO | WO 2007/041295 A2 | 4/2007 |

OTHER PUBLICATIONS

Chinese-language Office Action issued in counterpart Chinese Application No. 201480018919.1 dated Nov. 15, 2016 (8 pages).
Japanese-language Office Action issued in counterpart Japanese Application No. 2013-068049 dated Mar. 7, 2017 (4 pages).
Japanese-language Office Action issued in counterpart Japanese Application No. 2017-112373 dated Jun. 26, 2018 with unverified English translation (four pages).

* cited by examiner

MOBILE BODY AND POSITION DETECTION DEVICE

TECHNICAL FIELD

The present invention relates to a mobile body attached with a position detection device that outputs a control command to travel control means of the mobile body in order to induce the mobile body to a target area, and the position detection device.

BACKGROUND ART

In the related art, for example, Patent Document 1 (Japanese Patent Application Laid-Open No. 2010-95146) discloses an automated guided vehicle (AGV) which travels along a guide line that has been drawn on a travel route for transportation and cargo handling operation of parts, in factories, logistics warehouses, and the like. The automated guided vehicle is provided with a route detector magnetically detecting a guide line, the route detector sends a detection signal to a controller of the vehicle for controlling drive wheels, thereby allowing the automated guided vehicle to travel along the guide line.

Further, for example, a mobile body system disclosed in Patent Document 2 (Japanese Patent Application Laid-Open No. 2010-140247) is known as a technique for controlling autonomous movement of a mobile robot to a destination. The mobile body system includes a distance sensor that detects the distance and the direction to an object that exists in a search range of a mobile robot, map information storage means for storing map information on a travel route containing positions where flat plate-like marks are installed, and traveling direction determination means for determining the traveling direction of the mobile robot by comparing a detection result from a distance-direction detection device and map information stored in map information storage means, and is configured to induce the mobile robot to the target area along a preset route, by controlling the travel drive system (wheel) of the mobile robot, while estimating the position of the mobile robot on the map by comparing the map information with the measurement information from the distance sensor.

CITATION LIST

Patent Documents

Patent Document 1: Japanese Patent Application Laid-Open No. 2010-95146
Patent Document 2: Japanese Patent Application Laid-Open No. 2010-140247

SUMMARY OF THE INVENTION

Problem to be Solved by the Invention

Since the automated guided vehicle disclosed in Patent Document 1 travels along the vehicle route by detecting the guidelines for travel route guidance, when the travel route of the automated guided vehicle is changed, there is a need to re-draw the guidelines. Meanwhile, since the mobile body system disclosed in Patent Document 2 is a system which autonomously moves the mobile robot while estimating the position and the attitude of the mobile robot on the movement route along the pre-set route, the mobile body system has a function capable of easily changing the route of the mobile robot by simply changing the setting of the target area.

Therefore, if the automated guided vehicle travelling along the guideline for travel route guidance is improved to a trackless mobile robot, it is possible to achieve a function capable of easily changing the route of the mobile robot by simply changing the setting of the target area. However, the mobile body system disclosed in Patent Document 2 is the completed system including the drive control means of the mobile robot, and it is not possible to actually achieve an autonomous automated guided vehicle only by attaching the mobile body system used in Patent Document 2 to the automated guided vehicle of Patent Document 1. Furthermore, it is not possible to apply the mobile body system used in Patent Document 2 to directly cope with the need for visually inducing a vehicle to a target area and supporting, for example, in a manually operated work vehicle in which a mobile body is not provided with drive means and manually travels, a manned self-propelled work vehicle that a worker operates, or the like. In other words, the mobile body system disclosed in Patent Document 1 is a system that has been optimized and completed as an autonomous type mobile robot, which controls forward and backward movements and the steering direction of the mobile robot by controlling the travel drive system (wheel) of the mobile robot, while estimating the position of the mobile robot on the map by comparing the map information, and induces the mobile robot to a set target area. Therefore, in order to realize the automatic induction function in the mobile body without these automatic induction functions, it is necessary to generate a control system in which the automatic induction function is incorporated into each mobile body, as a complete control system.

For this reason, for example, even in a case where a technique for inducing a route to the target area is applied to a route induction type mobile body, as the use other than the autonomous mobile body, improvement is required to include control means for controlling the drive system of the mobile body, such that there is a problem in that improvement cost is increased and versatility is poor.

The present invention has been made to solve the above problems, and an object of the present invention is to provide a mobile body attached with a position detection device and the position detection device, in which the position detection device is available and excellent in diversity by simply being attached to various types of mobile objects, and outputs a control command to travel control means of the mobile body.

Means for Solving the Problems

A mobile body according to the present invention includes input means for inputting a mobile target position of the mobile body; and a distance sensor that measures a distance from the mobile body to an ambient environment, in which the mobile body is attached with a position detection device that is incorporates position identification means for identifying a position and an angle of the mobile body by using map information on an ambient environment surrounding the mobile body and information obtained from the distance sensor, and relative position calculation means for calculating the relative position and the relative angle of the mobile body relative to the target position and the target angle of the mobile body that are set by the input means, in which the position detection device outputs a control command to travel control means of the mobile body, based on an identification result of the position identification means and a calculation result of the relative position calculation means.

Further, in the mobile body according to the present invention, the input means and the distance sensor are incorporated into the position detection device.

Further, in the mobile body according to the present invention, the position detection device includes absolute position calculation means for receiving absolute map coordinates of an origin of a map by the input means, and calculates an absolute position and an absolute angle of the mobile body from the absolute map coordinates.

Further, in the mobile body according to the present invention, the position detection device outputs a calculation result of the absolute position calculation means to a display device that displays a position of the mobile body.

Further, in a position detection device that is attached to the mobile body according to the present invention, the mobile body is an automated guided vehicle (AGV), and the position detection device is configured to output a control command from the relative position calculation means of the position detection device attached to the automated guided vehicle to the travel control means of the automated guided vehicle.

Further, in a position detection device that is attached to the mobile body according to the present invention, the mobile body is a nursing walker as a manual-type mobile body, and the position detection device is configured to display absolute position information on the nursing walker from the absolute position calculation means of the position detection device attached to the nursing walker, on a display device.

Further, in a position detection device that is attached to the mobile body according to the present invention, the mobile body is a forklift, and the position detection device is configured to display absolute position information on the forklift from the absolute position calculation means of the position detection device attached to the forklift, on a display device.

Further, a position detection device according to the present invention includes input means for inputting a mobile target position and a target angle of a mobile body; position identification means for identifying a position and an angle of the mobile body by using information obtained from a distance sensor that measures a distance from the mobile body to an ambient environment, and map information on an ambient environment; and relative position calculation means for calculating a relative position and a relative angle of the mobile body relative to the target position and the target angle, and outputs an identification result of the position identification means and a calculation result of the relative position calculation means.

Further, a position detection device according to the present invention includes input means for inputting a target route of a mobile body; position identification means for identifying a position and an angle of the mobile body by using information obtained from a distance sensor that measures a distance from the mobile body to an ambient environment, and map information on an ambient environment; and relative route calculation means for calculating a relative distance and a relative angle of the mobile body relative to the target route, and outputs an identification result of the position identification means and a calculation result of the relative route calculation means.

Advantageous Effect of the Invention

A mobile body attached with a position detection device that outputs a control command to travel control means of the mobile body according to the present invention can induce an autonomous mobile body to a target area along a route that a user sets in the autonomous mobile body, by outputting an identification result of position identification means and a calculation result of relative position calculation means, to the autonomous mobile body, and can induce the user by visually displaying a route to the target area, if a calculation result of absolute position calculation means is output to the display device.

MODES FOR CARRYING OUT THE INVENTION

Hereinafter, embodiments of the present invention will be described in detail.

Figure 1:
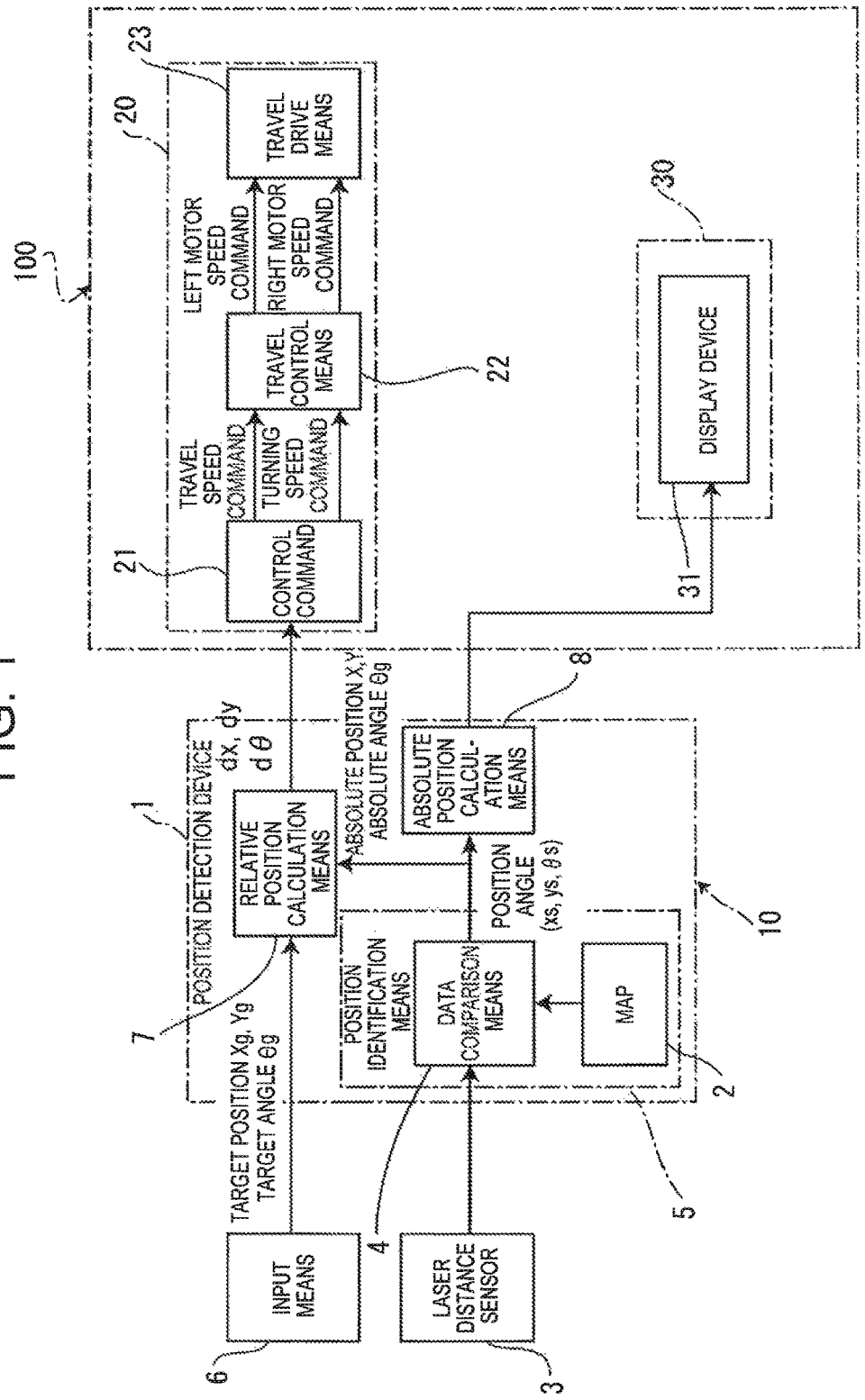
FIG. 1 is a schematic block diagram illustrating an entire control system in which a position detection device of the present invention is applied to an autonomous moving body.

FIG. 1 is a schematic block diagram illustrating an entire control system in which a position detection device 1 of the present invention is applied to an autonomous mobile body. As illustrated in FIG. 1, the position detection device 1 attachable to the mobile body 100 is formed of a component 10, and is provided with input means 6 for inputting a target position (Xg, Yg) (a target angle (θg) if necessary) of the mobile body 100 and a laser distance sensor 3 that captures ambient environment data of the mobile body 100. The position detection device 1 attachable to the mobile body 100 includes position identification means 5 which is provided with map data 2 recorded on a recording medium of which a recording mode is not specified and data comparison means 4 for comparing and collating the map data 2 with measurement data obtained from the distance sensor 3, relative position calculation means 7 for calculating a relative position (if necessary, a relative angle) of the mobile body 100 relative to the target position (Xg, Yg) (if necessary, a target angle (θg)) of the mobile body 100 that has been set by the user using the input means 6, and absolute position calculation means 8 for calculating the position (if necessary, an angle) of the mobile body 100 that is obtained from the identification result by the position identification means 5. The above-described means are unitized into a component 10, which can be attached to various moving bodies.

The distance sensor 3 is, for example, a two-dimensional scan-type distance sensor such as a two-dimensional laser range finder, and if an area of about 270° from the sensor mounting position as a center in the plane (scan plane) that is not tilted to the left or right is scanned and irradiated with the laser light beam in a fan shape, the distance sensor 3 measures distances to surrounding objects such as walls or shelves by receiving the reflected light. Map data 2 contains data of boundaries around objects such as walls or shelves. The position identification means 5 receives measurement data from the distance sensor 3, compares the measurement data with the map data 2, calculates and processes an absolute position X, Y (if necessary, an absolute angle (θ)) of the mobile body 100 on the map by the absolute position calculation means 8, and calculates the relative position of an absolute position of the position detection device relative to a target position, from an absolute position X, Y (if necessary, an absolute angle (θ)) of the position detection device and a target position from the input means 6 (Xg, Yg) (if necessary, target angle (θg)).

The user sets in advance the position (Xg, Yg) of the target point (if necessary, target angle θg) and a route or a course leading to the target point by using the input means 6 such as a keyboard or a mouse, and inputs the set values as route data to the relative position calculation means 7. Here, a case will be described where there is a target angle θg. The route data is data required for the mobile body 50 to autonomously move, and contains the positions (coordinates) of passing points on the planned (specified) route, a course or a route to move (travel) to the target area, and data indicating the attitude (angle) at the target point. The route data subjected to an arithmetic process by the relative position calculation means 7 is output to the travel drive means 23 of the autonomous mobile robot 20, as a control command 21 (dx, dy, dθ). The autonomous mobile body robot 20 is provided with travel drive means 23 which includes left and right wheels for movement-controlling the autonomous mobile robot 20, motors capable of individually driving the respective wheels, and the like. The speed (control due to dx, dy) and the steering angle (control due to dθ) of the autonomous mobile body robot 20 are controlled by outputting the control command 21 (dx, dy, dθ) from the relative position calculation means 7 to the travel control means 22, and it is possible to induce the autonomous mobile body robot 20 to the target area by tracing a route set by the user.

Figure 2:
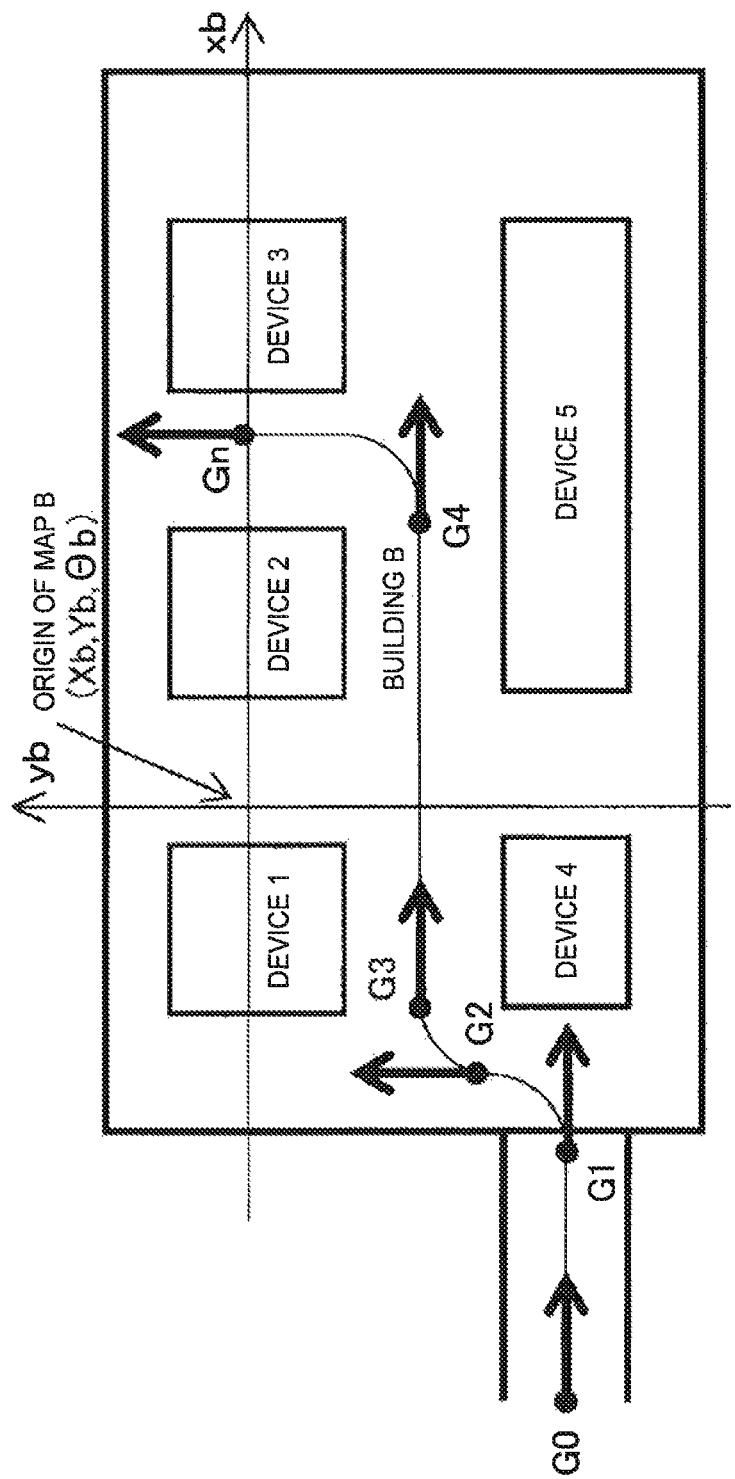
FIG. 2 is an explanatory view illustrating a relationship between a start point and a target point in a map B, with an origin of the map as a reference.

An operation reaching a target point Gn from a start point G0, with an origin defined on a map B as a reference, will be described using FIG. 2. The origin of the map B is formed in an intersection of an xb axis and a yb axis on the map B. The coordinates on the map B are expressed by (Xb, Yb, θb). An angle (θb) is a value indicating an attitude (orientation) of the mobile body 100. The mobile body 100 is in a horizontal-right direction at a start point G0, starts moving and proceeds to a first waypoint G1 in front of a device 4 in a horizontal direction as it is, and reaches a second waypoint G2 in a vertical-upward direction, while turning to the left by 90 degrees with a certain turning radius from the first waypoint G1. Next, the mobile body 100 turns to the right with a certain turning radius up to a third waypoint G3 in front of a device 1 so as to rotate by 90 degrees to the right and be in a horizontal-right direction, and proceeds to the third waypoint G3 as it is. In addition, after the mobile body 100 proceeds straight up to a fourth waypoint G4 in front of the device 3 in the side of a device 5, the mobile body 100 turns to the left with a certain turning radius by 90 degrees so as to be in a vertical-upward direction, and proceeds straight to reach a destination Gn. The mobile body 100 has a horizontal attitude relative to the device 3 at the destination Gn. The mobile body 100 stores in advance map data containing the inner size of the building B and the outlines of the devices 1 to 5, which are based on the origin of the map B, measures the data of the ambient environment from the mobile body 100 for each sampling time, and controls the travelling, while comparing and matching the measurement data and the map data, and obtaining the absolute position and the relative position relative to the target position.

As described above, the absolute position calculation means 8 of the position detection device 1 attachable to the mobile body 100 of the present invention can calculate the absolute position in a coordinate system with a specific point on a predetermined map of an environment where the mobile body 100 moves as an origin. The absolute coordinates obtained from the absolute position calculation means 8 can be output to the display device 31 of the display means 30 of the mobile body 100. Thus, the absolute position (X and Y coordinates) of the mobile body 100 and the absolute angle of the mobile body 100 are displayed on the display device 31 provided in the display means 30 of the mobile body 100, and the route to the target area can be displayed.

In the present invention, as described above, the position detection device 1 is unitized into the component 10 and is configured to be able to be attached to various moving bodies 100, and a control command after the completion of the calculation for the mobile body 100 is output from the attached position detection device 1, such that it is possible to attach the position detection device 1 to various types of mobile bodies, without being limited to a particular type mobile body.

Figure 3:
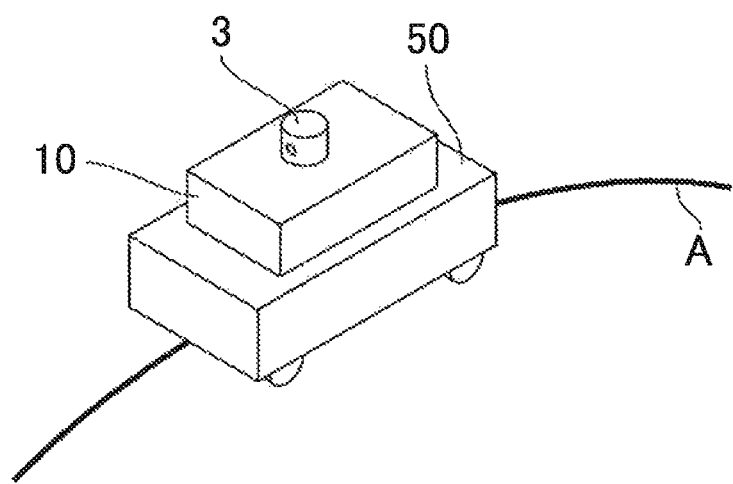
FIG. 3 is an external perspective view illustrating an example in which a position detection device of the present invention is attached to an autonomous mobile body.

In other words, although the autonomous mobile robot 20 is illustrated as the mobile body in FIG. 1, for example, as illustrated in FIG. 3, it is possible to attach the position detection device 1 as the component 10, to the automated guided vehicle 50 as the mobile body, and in this case, if a change is performed such that a control command 21 is output to the travel control means 22 incorporated into the automated guided vehicle 50, it is possible to induce and control the automated guided vehicle 50 in a trackless manner up to a target area along a predetermined route by easily controlling the traveling and the steering angle of the automated guided vehicle 50. Thus, if the route of the automated guided vehicle 50 is changed, it is possible to easily change the route of the automated guided vehicle 50, by simply changing the setting of the target area, without changing the installation of the guide line A formed on the route.

Figure 4:
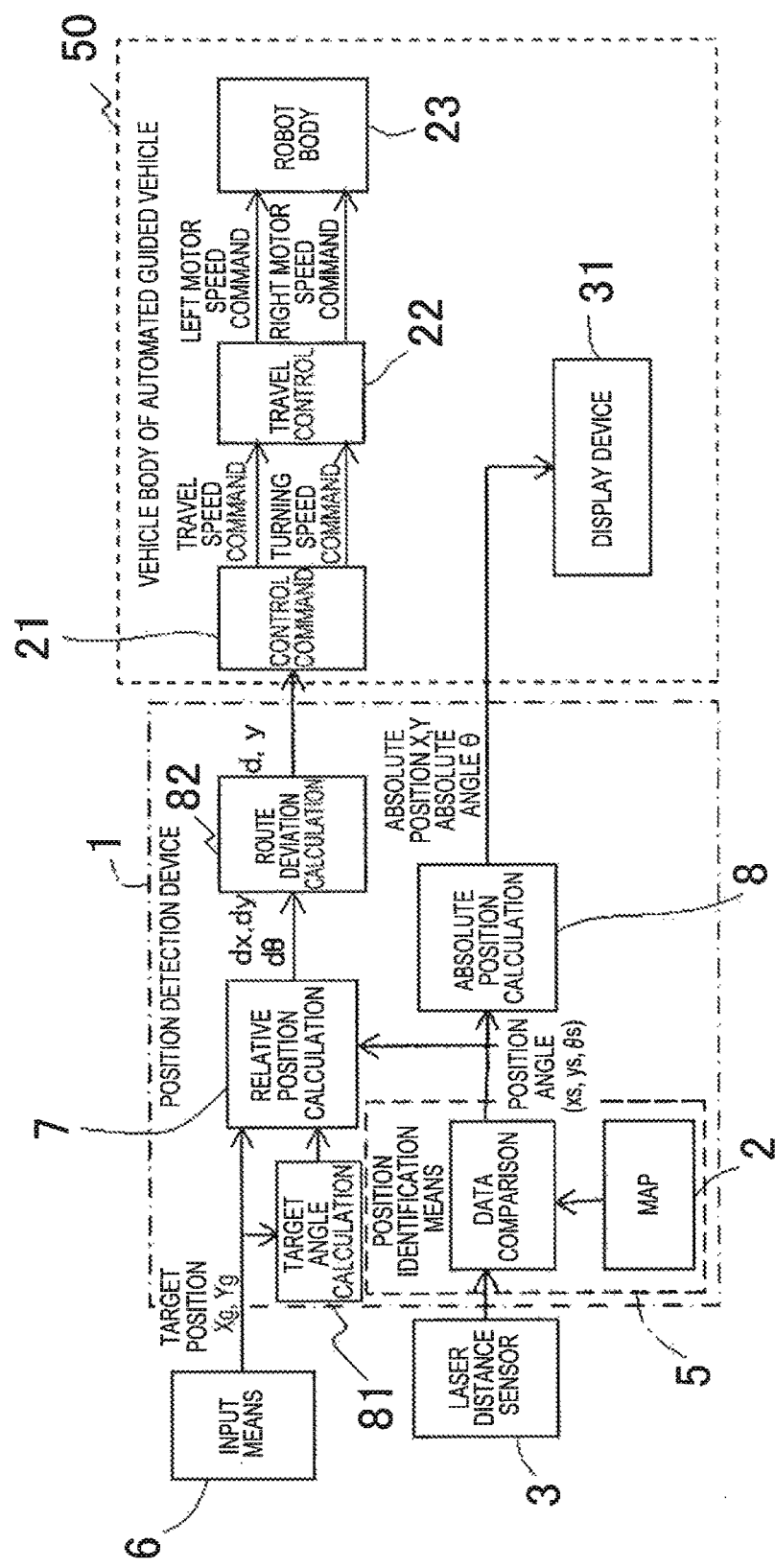
FIG. 4 is a schematic block diagram illustrating an entire control system for applying the position detection device of the present invention to the autonomous moving body, other than FIG. 1.

FIG. 4 illustrates an example in which the position detection device is applied to the automated guided vehicle 50 that moves along the route A. FIG. 4 is different from FIG. 1 in that information that is input to the position detection device 1 from the input means 6 is only the target position Xg, Yg, and the target angle θg is not input. The target angle θg is calculated by target angle calculation means 81, using the target position Xg, Yg. For example, the target angle θg2 of the target point G2 is obtained by the following equation.

$$\theta g2 = \tan^{-1}\{(Yg2-Yg1)/(Xg2-Xg1)\}$$

In other words, the slope of a line from the previous target point G1 to the target point G2 is calculated. Thus, it is possible to reduce the amount of information that is input from the input means 6. Furthermore, it is possible to determine a route A along which the automated guided vehicle 50 is traveling, by setting the target points G0 to Gn, as illustrated in FIG. 5.

Next, FIG. 4 is similar to FIG. 1 in that the relative position calculation means 7 calculates the relative distance dx, dy and the relative angle dθ to the target point, but FIG. 4 is different from FIG. 1 in that they are input to the route deviation calculation means 82.

Figure 5:
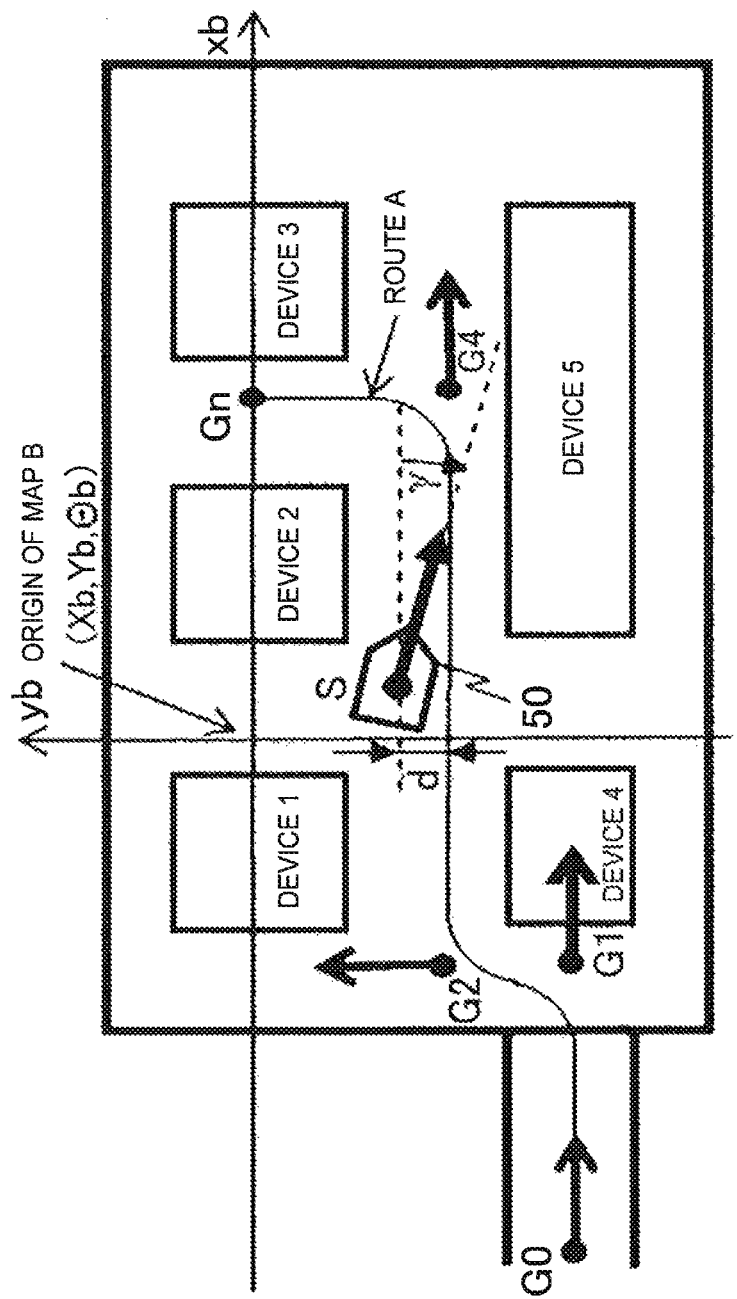
FIG. 5 is an explanatory view illustrating a relationship between a start point and a target point in a map B, different from FIG. 2, when the position detection device is applied to an automated guided vehicle travelling along a route.

If it is assumed that the automated guided vehicle 50 is in a state illustrated in FIG. 5 when the automated guided vehicle 50 is traveling toward the target point G4, the position deviation d from the route A corresponds to the relative distance dy from the target point G4, and thus it is possible to obtain the position deviation d by selecting the relative distance dy. Further, since the angle deviation γ for the route A corresponds to the relative angle dθ, the angle deviation γ is output by selecting the relative angle dθ. It is possible to realize the same control as in the automated guided vehicle in the related art, by outputting a control command 21 to the travel control means 22 of the automated guided vehicle 50. Since it is possible to travel the automated guided vehicle using the same control method, by simply changing the position detection device 1, without requiring magnetic tapes, markers, or the like that are installed on the site as in the related art, there is an advantage to be able to construct a system with flexibility.

Figure 6:
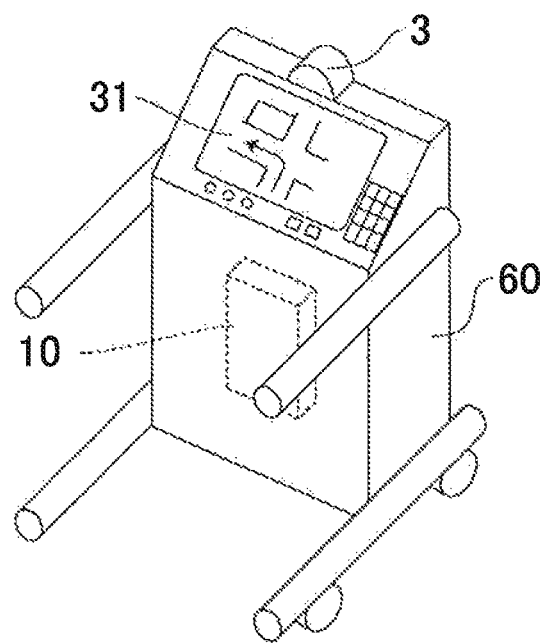
FIG. 6 is an external perspective view illustrating an example in which the position detection device of the present invention is attached to a manual-type mobile body.

Further, as illustrated in FIG. 6, for example, if a nursing walker 60 (a manual-type mobile body) used for rehabilitation and the like in a hospital is applied as the mobile body and an absolute position of the nursing walker 60 is displayed on the display device 31 installed in the nursing walker 60 from the absolute position calculation means 8, it is possible to induce the user by displaying the direction in which the nursing walker 60 proceeds along the set route, when a user is walking with the assistance of the nursing walker 60 through the pre-specified route. This can assist walking while visually inducing the user to the target area using the display device 31.

In this case, there is a safety problem that the nursing walker 60 includes power for traveling. Although not described in detail, an encoder is provided in a self-propelled wheel, and the encoder can be used to monitor whether or not the wheel is self-propelled according to a control command from the relative position calculation means. In addition, when attempting to travel in a direction different from the objective, it is also possible to exert a braking force.

Figure 7:
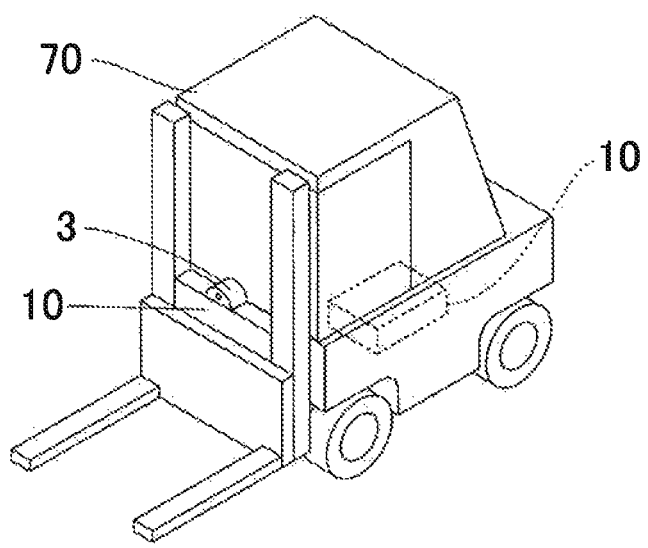
FIG. 7 is an external perspective view illustrating an example in which the position detection device of the present invention is attached to a forklift.

Further, as illustrated in FIG. 7, even when a self-propelled forklift 70 that a driver drives is applied as a mobile body, if information is output to the display device 31 installed in the forklift 70 from the absolute position calculation means 8, it is possible to induce the driver by displaying the direction in which the forklift 70 proceeds along the set route, in factories, logistics warehouses, and the like.

In the present invention, as described above, the position detection device 1 is unitized into the component 10, such that it can be attached to various mobile bodies such as autonomous, self-propelled, manual-type mobile bodies, and it is excellent in versatility. The configuration can also be simplified without including a configuration for controlling the travel drive system of the mobile body in the position detection device 1.

DESCRIPTION OF REFERENCE NUMERALS

1 POSITION DETECTION DEVICE
2 MAP DATA
3 DISTANCE SENSOR
4 POSITION IDENTIFICATION MEANS
6 INPUT MEANS
7 RELATIVE POSITION CALCULATION MEANS
8 ABSOLUTE POSITION CALCULATION MEANS
10 POSITION IDENTIFICATION COMPONENT
20 AUTONOMOUS MOBILE ROBOT (MOBILE BODY)
30 DISPLAY MEANS
31 DISPLAY DEVICE
50 AUTOMATED GUIDED VEHICLE (MOBILE BODY)
60 NURSING WALKER (MOBILE BODY)
70 FORKLIFT (MOBILE BODY)
82 ROUTE DEVIATION CALCULATION MEANS
100 MOBILE BODY

The invention claimed is:

1. A mobile apparatus comprising:
a position detection device; and
an autonomous mobile body, wherein
the position detection device comprises
a keyboard or mouse configured to input route data including a target point of the mobile body and passing points leading to the target point,
a distance sensor that measures a distance from the mobile body to an object existing in an ambient environment,
map data on the ambient environment in which the mobile body travels,
a processor configured to: i) identify position data of the mobile body by comparing measurement data for each sampling time from the distance sensor and the map data on the ambient environment, and ii) calculate a relative position and a relative angle to an absolute position and the absolute angle of the target point from the position data and the route data of the mobile body, and
the autonomous mobile body comprises
a controller that controls an autonomous travel of the autonomous mobile body itself by using the relative position and the relative angle received from the position detection device as control signals, wherein
the processor is also configured to calculate an absolute position and an absolute angle of the mobile body based on absolute map coordinates on the map data,
a display device that displays a position of the mobile body based on the calculation result of the processor,
a user sets in advance the absolute angle of the mobile body via at least one of a keyboard and a mouse.

2. The mobile apparatus according to claim 1, wherein the autonomous mobile body is an automated guided vehicle (AGV).

3. The mobile apparatus according to claim 1, wherein the autonomous mobile body is a forklift.

* * * * *